United States Patent [19]

Nola

[11] 4,433,276

[45] Feb. 21, 1984

[54] THREE PHASE POWER FACTOR CONTROLLER

[75] Inventor: Frank J. Nola, Huntsville, Ala.

[73] Assignee: The United States of America as represented by the Administrator of the National Aeronautics and Space Administration, Washington, D.C.

[21] Appl. No.: 476,244

[22] Filed: Mar. 14, 1983

Related U.S. Application Data

[63] Continuation of Ser. No. 199,765, Oct. 23, 1980, abandoned.

[51] Int. Cl.³ .............................................. H02P 7/36
[52] U.S. Cl. .................................... 318/729; 318/798; 318/805; 318/810; 318/438
[58] Field of Search ............... 318/729, 768, 771, 798, 318/805, 807, 809, 810, 812, 813, 825, 826, 438

[56] References Cited

U.S. PATENT DOCUMENTS

| | | | |
|---|---|---|---|
| 3,997,825 | 12/1976 | Miyasita et al. | 318/729 |
| 4,011,489 | 3/1977 | Franz et al. | 318/798 |
| 4,052,648 | 10/1977 | Nola | 318/729 |
| 4,078,393 | 3/1978 | Wills | 318/806 X |
| 4,176,307 | 11/1979 | Parker | 318/798 |
| 4,237,531 | 12/1980 | Cutler et al. | 318/798 X |
| 4,255,695 | 3/1981 | Plunkett et al. | 318/807 X |
| 4,266,177 | 5/1981 | Nola | 318/810 |
| 4,298,831 | 11/1981 | Espelage et al. | 318/729 X |
| 4,323,835 | 4/1982 | Lee | 318/729 |
| 4,333,046 | 6/1982 | Lee | 318/729 |

OTHER PUBLICATIONS

NASA Technical Support Package, Brief No. MFS-23280; 4/2/79, "Power Factor Controller."
McGraw-Hill, "Dictionary of Scientific and Technical Terms," 1966; p. 1534.

Primary Examiner—J. V. Truhe
Assistant Examiner—Richard M. Moose
Attorney, Agent, or Firm—Joseph H. Beumer; John R. Manning; Leon D. Wofford, Jr.

[57] ABSTRACT

A power control circuit for a three phase induction motor wherein power factors for the three phases are summed to provide a control signal, and this control signal is particularly filtered and then employed to control the duty cycle of each phase of input power to the motor.

21 Claims, 7 Drawing Figures

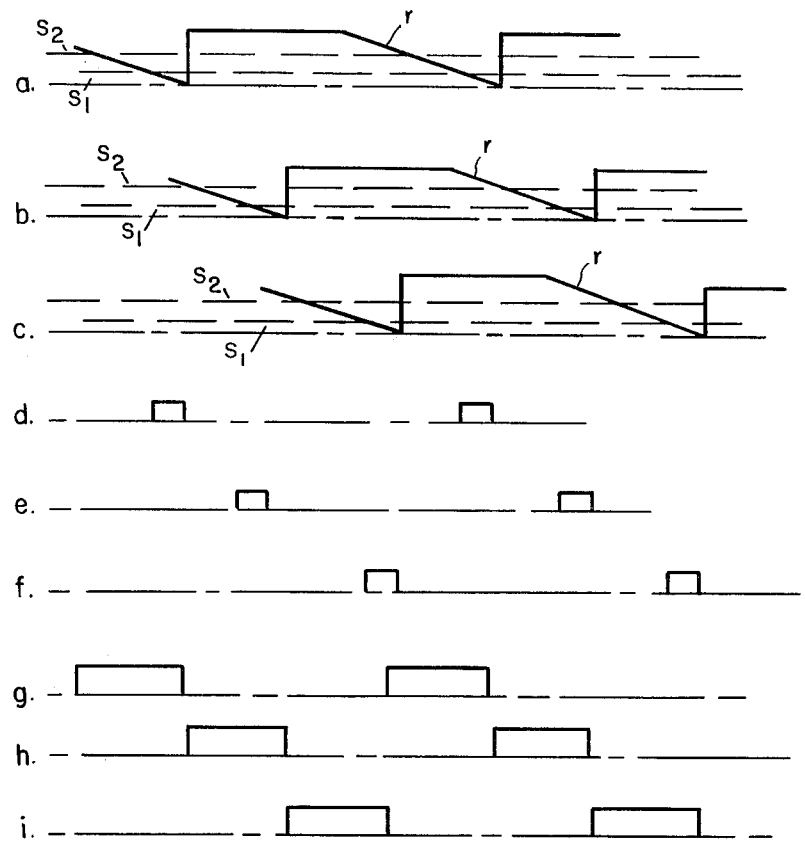
FIG. 4
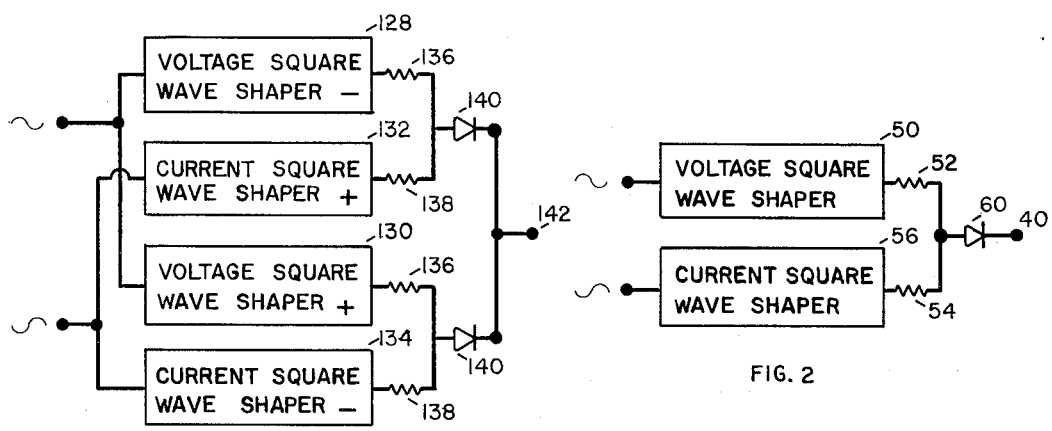
FIG. 6
FIG. 2

THREE PHASE POWER FACTOR CONTROLLER

ORIGIN OF THE INVENTION

This invention described herein was made by an employee of the United States Government and may be manufactured and used by or for the Government of the United States for governmental purposes and without the payment of any royalties thereon or therefor.

This application is a continuation of application Ser. No. 199,765, filed Oct. 23, 1980, now abandoned.

TECHNICAL FIELD

This invention relates to power input controls for induction motors, and particularly to an improved control for regulating power input to a three phase motor as a function of load.

BACKGROUND ART

The applicant previously described in U.S. Pat. No. 4,052,648 a power reduction system for induction motors in which the effective voltage input to the motor is varied directly as a function of load. In that patent it is noted that the power factor of such motors varies directly with loading, and that the power factor of a less than fully loaded motor might be maintained at an optimum level by reducing the effective voltage to the motor, the applicant earlier determined, and such is described in referenced patent, that power input to a motor may be automaticaly varied as a function of load by commanding that it operate at a selected power factor. The system described in this patent has been very successful and has been widely used with respect to single phase motors.

The applicant also tested the applicability of this system to three phase motors, testing being of motors wherein the "Y", or common reference power, terminal of the motor is brought out of the motor and available for control purposes. It worked well. In many three phase motors, however, it has been found that a common reference terminal is not available, that is, a common reference terminal through which current from all three phases flow. It further appears that simply sampling one of the three phases of the motor and deriving a power factor control signal from it is not satisfactory. Significant stability problems may be encountered.

It is an object of this invention to provide an improved three phase power factor controller particularly adaptable for employment with three phase motors wherein there is not available a terminal common to all phases, and wherein problems of motor instability are overcome.

DISCLOSURE OF THE INVENTION

In accordance with this invention, a power factor, or phase detector, is employed for each of the phases of a three phase induction motor, and the detected values are summed to effect a composite signal, and this signal is used as a basis of control. The signal is subjected to signal conditioning, including signal integration, and employed to control the turn-on time of each of three thyristors coupling power to the motor.

BRIEF DESCRIPTION OF THE DRAWINGS

FIG. 2 is an electrical schematic diagram of the phase detectors employed in the embodiment of the invention shown in FIG. 1.

FIG. 4 consists of a series of waveforms illustrating the generation of triggering pulses in accordance with the circuitry shown in FIG. 1.

FIG. 6 is an electrical schematic diagram of the phase detector employed in the embodiment of the invention shown in FIG. 5.

BEST MODE FOR CARRYING OUT THE INVENTION

Figure 1:
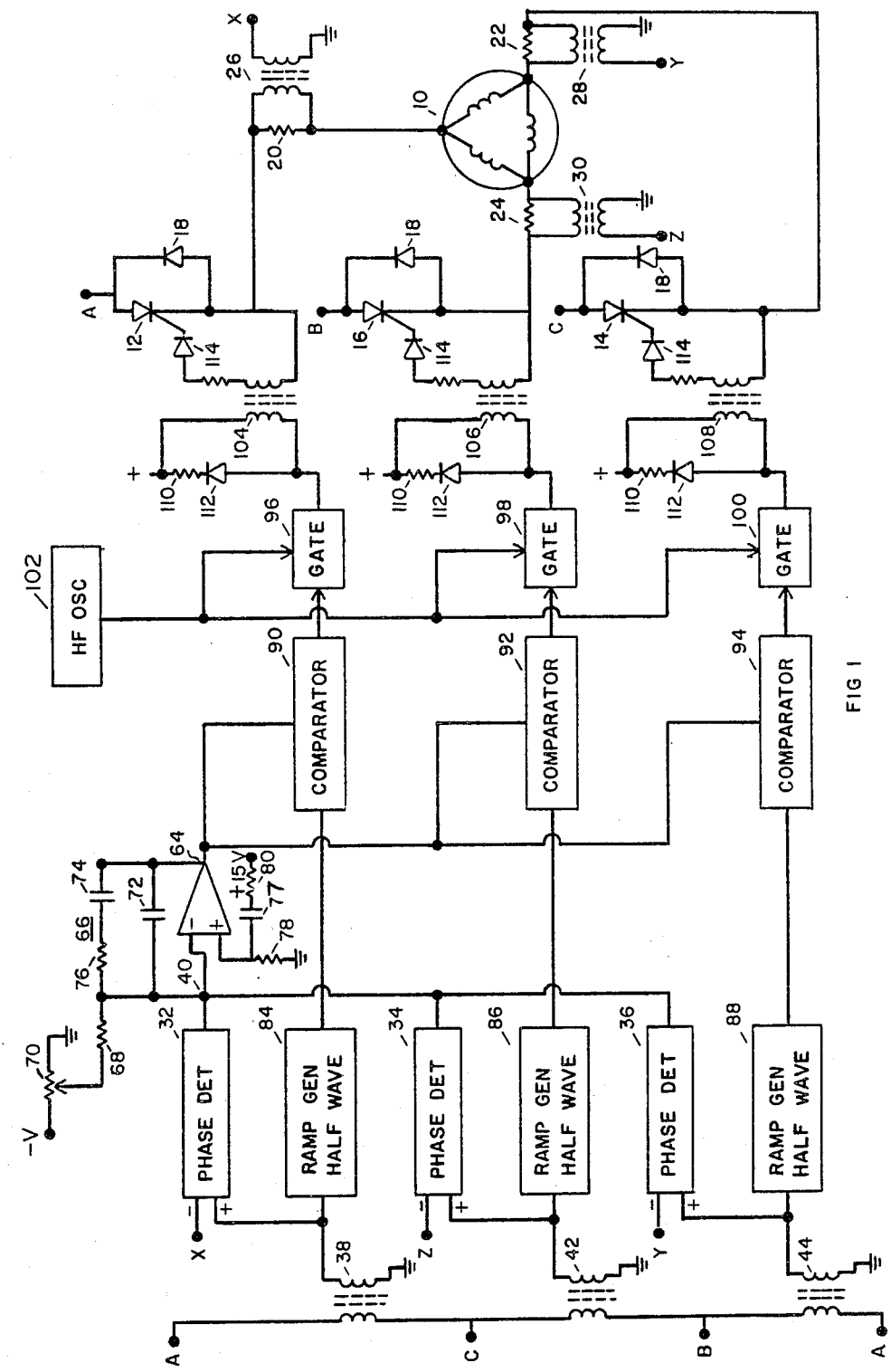
FIG. 1 is an electrical schematic diagram of an embodiment of the invention.

Referring initially to FIG. 1, a three phase motor 10 is powered through SCR (silicon control rectifier) devices 12, 14, and 16 from a three phase power line, typically providing 220 or 440 volts, 60 cycle, A.C. from terminals A, B, and C. One phase of such a signal is illustrated by voltage wave a of FIG. 3. As the SCR devices provide for conduction only in one direction, a diode 18 is connected across each SCR and poled for opposite direction conduction. Current is sampled by current sampling transformers 26, 28, and 30, shunted by resistors 20, 22, and 24, each of these resistors being connected in series with an input to motor 10. Transformers 26, 28, and 30 are individually connected across one of these resistors (via a primary winding, as shown), and with one secondary terminal grounded, the other secondary terminal provides a discretely phased current signal output (as shown in waveform c of FIG. 3). Terminal X is associated with phase A, terminal Z is associated with phase B, and terminal Y is associated with phase C. A power factor signal, a signal proportional to the current-voltage phase differential of each of the three phase inputs is obtained, separately, by phase detectors 32, 34, and 36. Phase detector 32 receives a current responsive signal sample from terminal X, representative of the A phase current, and a voltage signal from transformer 38, representative of the A-C phase voltage, and provides a first phase detected output on terminal 40. Phase detector 34 receives a sample from terminal Z, representative of the B phase current, and a C-B voltage sample from transformer 42 and provides a second phase detected output on terminal 40. Phase detector 36 receives a phase C current signal sample from terminal Y, and a B-A phase voltage sample from transformer 44 and provides a third phase detection signal on terminal 40. The three signals, designated $P_1$, $P_2$, and $P_3$, respectively, from the three phase detectors are shown in waveforms f and g of FIG. 3.

The phase detectors are identical, and an embodiment of each is shown in FIG. 2. It includes two conventional squaring circuits. One is voltage square wave shaper 50, which provides through resistor 52 a rectangular wave (waveform b of FIG. 3) responsive to the input voltage (waveform a of FIG. 3). The second one is current square wave shaper 56, which provides through resistor 54 a rectangular wave (waveform d of FIG. 3), representative of the negative half cycle of input current (waveform c of FIG. 3). This output of phase detection is also noted by the ± signs at the input terminals of the phase detectors (as shown in FIG. 1). The outputs of the two wave shaping circuits are combined through resistors 52 and 54. Diode 60 passes only the positive portion of each output to terminal 40, which is common with the outputs of phase detectors 32, 34, and 36 (as shown in FIG. 1). Waveform e illustrates the combination process showing the waveform of a single phase detector as it would appear without diode 60, which diode eliminates the negative portions of the waveforms. Significantly, in the detection process, each phase detector produces a pulse (e.g., $P_1$ from detector 32, $P_2$ from detector 34, and $P_3$ from detector 36) which is, in effect, turned "on" by the leading or rising edge of voltage waveform b and turned "off" by the trailing edge of waveform d. Thus, the width of pulse $P_1$ (it has a constant amplitude) tends to increase upon the occurrence of increased phase angle between current and voltage (thus decreased power factor) and decrease in width with decreased phase angle (and thus increased power factor).

Figure 3:
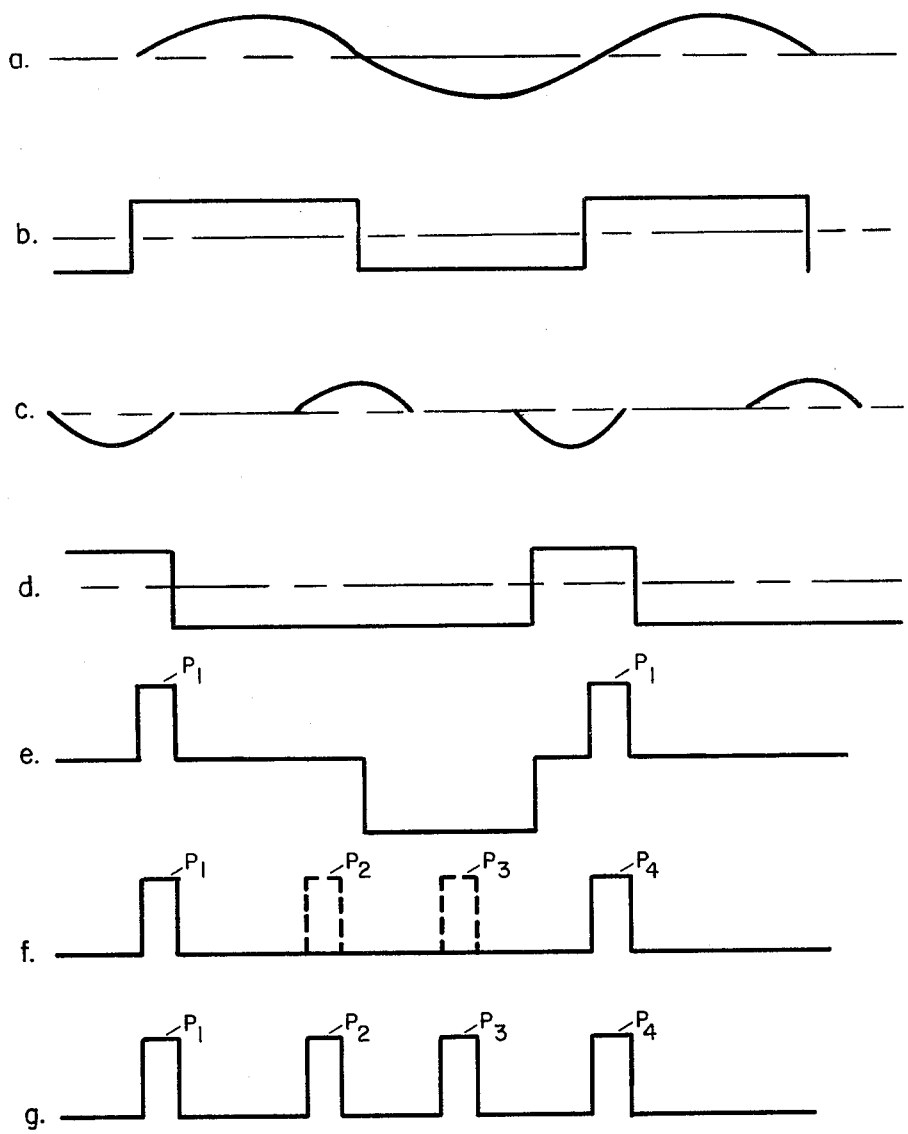
FIG. 3 consists of a series of waveforms illustrative of the operation of the phase detector shown in FIG. 2.

Assuming as indicated that pulse $P_1$ represents the output of phase detector 32, waveforms f and g illustrate the relatively time presence of output pulses $P_2$ and $P_3$ from phase detectors 34 and 36, respectively. As the outputs are brought together at terminal 40, waveform g of FIG. 3 illustrates the combined signals at this point. This composite of these becomes the basic feedback control signal, and as will be noted, this is a signal of pulses of a repetition rate of 180 Hz. This is in contrast to previous circuit approaches wherein a single phase detected output (from one of the three phases) is employed, which would, of course, have been either at 60 Hz or 120 Hz rate, depending upon whether a half or full wave detection was employed.

The next step in accordance with this invention is to effect a signal conditioning of the control signal wherein the direct current character of the signal must be compatible with the thyristor trigger circuitry and still have a frequency response up to on the order of 20 Hz. The control signal is applied to the inverting input of operational amplifier 64 of signal conditioner or integrating circuit 66, together with a power factor command signal supplied through resistor 68 from potentiometer 70. Potentiometer 70 is biased negatively to provide a difference or subtraction signal with respect to the positive signal as developed at the outputs of the phase detectors. Signal conditioning is effected by an inverse feedback network consisting of two circuits, one being capacitor 72 connected between the output and inverting input of operational amplifier 64, and the other consisting of a series combination of capacitor 74 and resistor 76 connected between these two points. The feedback network is basically an integrative or lag one. The combination of resistor 76 (approximately 15,000 ohms) and capacitor 74 (approximately 5 MFD) is initially effective (at 0 frequency) to commence providing a lag effect. At about 2 Hz, the lag state commences to diminish as the value of resistor 76 commences to have a dominant effect over capacitor 74. Then at about 20 Hz, capacitor 72 (approximately 0.68 MFD) commences to be effective to again impose a pronounced lag effect. The resulting signal is a relatively smooth signal representing the integral of the composite outputs of the phase detectors less the command signal. The signal, as used, is represented by the sample signal waveforms $S_1$ and $S_2$ as shown in FIG. 4. It is important that while the signals have a relatively smooth and constant level, approximating the average signal value present, the signal must be responsive to signal changes incident to changes in motor loading, typically calling for a signal response upward to approximately 20 Hz. This is achieved by the circuitry shown.

Inasmuch as the control system of the invention has the effect of providing a quite low RMS voltage of motor 10 in its normal running, but unloaded state, and such voltage would be inadequate to provide a starting voltage to the motors, means are provided to insure that the load or power factor control signal is ineffective until the motor is brought up to operating speed. This is accomplished by a delay circuit consisting of capacitor 77 connected to the positive, or non-inverting, input of operational amplifier 64, a resistor 78 connected between this input and ground, and resistor 80 in series with capacitor 77 and +15 volt power supply (as shown). Upon the application of power to motor 10, and at the same time to the bias supply (not shown) providing all bias voltages for the circuitry in FIG. 1, an initial charging current through resistors 78 and 80 is of a value sufficient to override a maximum input applied to the negative input of amplifier 64 for a period of several seconds. Thus, motor 10 may be brought up to operating speed before its input voltage may be effectively reduced in accordance with a control mode as described.

Thyristor triggering signals are developed by the comparison of the control signal (e.g., $S_1$ and $S_2$ of FIG. 4) output of operational amplifier 64 and ramp shaped signals r. A ramp signal for each phase is developed by one of conventional ramp generators 84, 86, and 88, responsive to A-C, C-B, and B-A phase voltages from transformers 38, 42, and 44, respectively. The ramp outputs r of these generators are illustrated by solid line in waveforms a, b, and c, respectively, of FIG. 4, and are separately applied to conventional comparators 90, 92, and 94, together with a control signal from operational amplifier 64. In operation, a comparator provides a pulse output when the level of the control signal, e.g., dashed line $S_1$ of FIG. 4, intersects the leading edge of a ramp signal. Thus, as shown, for example, with a control signal $S_1$ applied to the comparators, there is produced output pulses shown in waveforms d, e, and f of FIG. 4. These pulses, which result in the triggering of the thyristors, as will be described, occur once per cycle, and are thus representative of a half wave mode of operation. The relatively narrow triggering pulses shown as waveforms d, e, and f of FIG. 4 produce relatively short "turn on" times for SCR devices 12, 14, and 16, and thus produce a relatively low RMS input voltage to motor 10. This state of operation will initially have been brought about by phase detectors detecting a downward shift in power factor (by an upward shift in current-voltage phase angle) occurring when motor loading is shifted to a low state. The resulting output signal of operational amplifier 64 will be such as to produce a motor RMS input voltage which brings about an equilibrium between the commanded power factors determined by the bias output of potentiometer 70 and integrated output of the phase detectors.

The actual control of the current "turn on" periods for the thyristors is effected by gates 96, 98, and 100, which pass high frequency signals responsive to the outputs of comparators 90, 92, and 94. Gates 96, 98, and 100 are electronic switches and function to effect gating of the high frequency signal (e.g., 10 KHz) from high frequency oscillator 102 through the primary windings of transformers 104, 106, and 108 to the thyristors. Resistor 110 and diode 112 are connected in series across the primary of each transformer in order to suppress inductive voltages to a safe level consistent with semiconductive circuitry employed. The secondaries of transformers 104, 106, and 108 are connected, as shown) in series with diode 114 between the gate and cathode of SCR devices 12, 14, and 16. Turn on periods for the thyristors follow, for example, the periods of the pulse outputs of the comparators (as shown in waveforms d-i). The waveforms marked by waveforms g-i, which are produced by control signal $S_2$, are illustrative of the turn on periods for a moderately to substantially loaded motor in contrast to pulses shown in waveforms d-f, which are indicative of a slightly loaded or a motor having no load.

Figure 5:
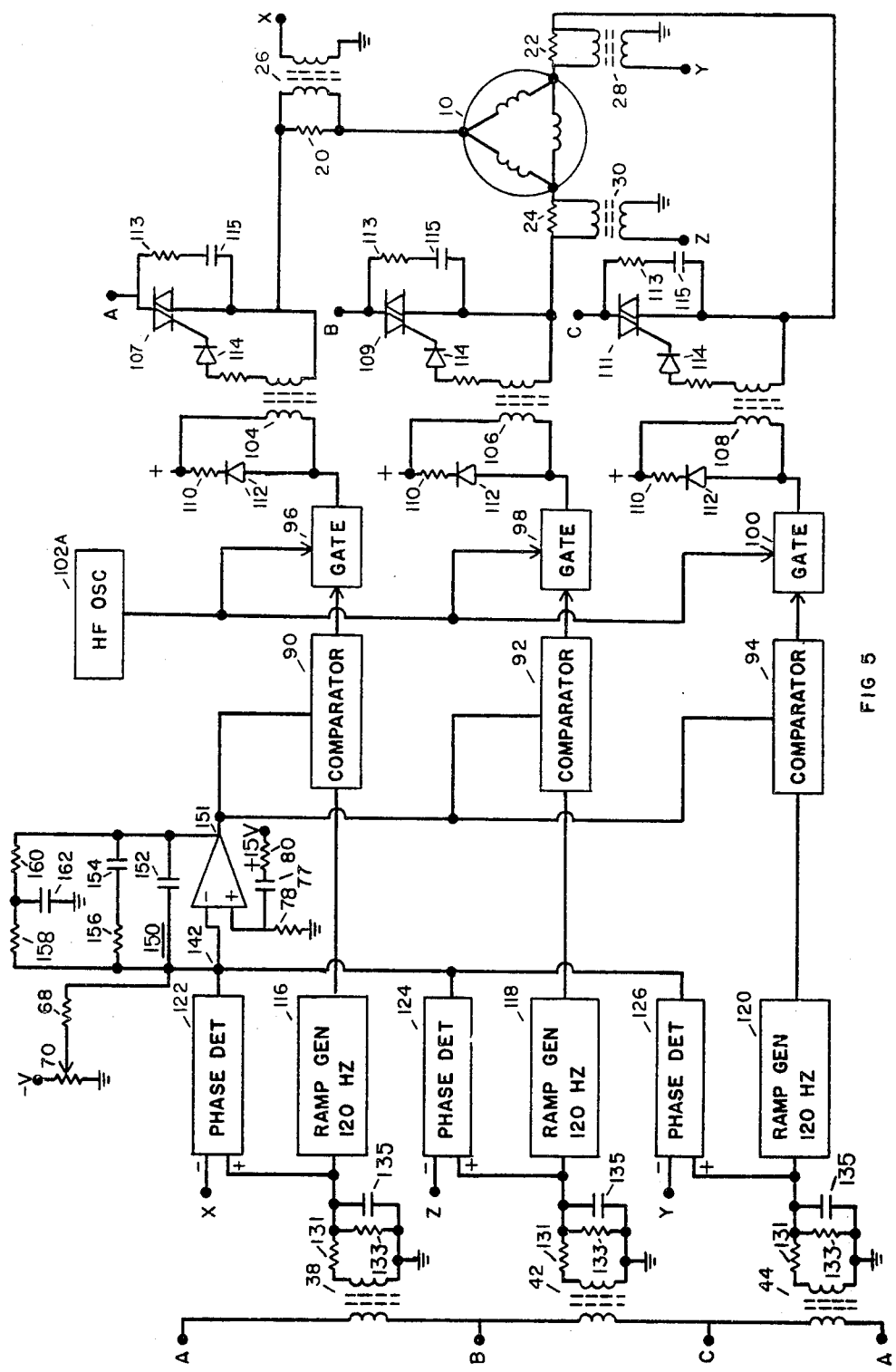
FIG. 5 is an electrical schematic diagram of an alternate embodiment of the invention.

FIG. 5 illustrates a modified form of the invention wherein instead of the employment of SCR devices, bi-directional Triac switches 107, 109, and 111 are employed. LIke components to those of FIG. 1 have like numerical designations. A resistor 113 and capacitor 115 are conventionally connected in series across the power terminals of each of the triac switches in order to stabilize their operation. Since the Triac switches are controllable during both half cycles of input power, it is necessary to provide a full wave control, and thus ramp generators 116, 118, and 120 are indicated as being 120 Hz devices. Likewise, phase detectors 122, 124, and 126 are full wave devices, and each is as shown in FIG. 6.

Figure 7:
FIG. 7 consists of a series of signal pulses illustrating the frequency of turn-on of the Triac-type thyristors employed in the circuit shown in FIG. 5 (Triac is a trademark of the General Electric Company of Syracuse, N.Y.).

Referring to FIG. 6, the phase detector includes two oppositely phased voltage squaring circuits 128 and 130 and two oppositely phased current squaring circuits 132 and 134. The outputs of voltage squaring circuit 128 and current squaring circuit 132 are summed through resistors 136 and 138 and the sum rectified by diode 140. Similarly, the outputs of voltage squaring circuit 130 and current squaring circuit 134 are summed through a like pair of resistors 136 and 138 and rectified by a diode 140. Finally, the rectified outputs of the squaring circuits appear on the common terminal 142, on which there is connected all phase detector outputs, as will be noted in FIG. 5. These outputs, there being two for each half cycle of input to each phase, appear in FIG. 7, showing that in a time period of one cycle of 60 cycle current, a period of 0.16 seconds, 6 output pulses occur. Thus, there is provided twice as many output pulses as the circuit shown in FIG. 1. By virtue of this higher frequency output, a frequency of 360 Hz compared to 180 Hz for the circuit of FIG. 1, the time constant characteristic of signal conditioning or integrating circuit 150 differs from signal conditioner 66 of the circuit of FIG. 1. Signal conditioner 150 includes three inverse feedback circuits between the output and input of operational amplifier 151, one consisting of capacitor 152, one consisting of capacitor 154 in series with resistor 156, and one consisting of resistors 158 and 160 and an intermediate capacitor 162 connected to ground. Capacitor 152 typically has a value of 0.15 MFD, or from 0.12 to 0.18 MFD. Capacitor 154 typically has a value of 20 MFD, or from 18 to 22 MFD. Resistor 156 typically has a value of 12,000 ohms, or in the range of from 10K to 15K ohms. Resistors 158 and 160 typically have like values of 18,000 ohms, or in the range of from 16K to 20K ohms, and capacitor 162 typically has a value of 3 MFD, or in the range of from 2 to 4 MFD. The function of these feedback circuits is as follows. Capacitor 152 provides a low pass filter to smooth the square wave feedback control signal. Capacitors 162 and 154 and resistors 156, 158, and 160 provide a lag-lead-lead network required for stabilizing the closed loop control signal.

The output of operational amplifier 151 (FIG. 5) is fed to comparators 90, 92, and 94, which function, as described, for their counterparts in FIG. 1, except that the rate of comparison performed by each is at a 120 Hz rate. The outputs of the comparators otherwise control gates 96, 98, and 100 in the same manner to apply high frequency triggering signals to Triacs 107, 109, and 111 during a portion of each half cycle (rather than during them only once each cycle, as in the case of the system shown in FIG. 1) determined by load on motor 10 to effect power control, as otherwise described with respect to FIG. 1.

As a further difference between the systems of FIGS. 1 and 5, it is to be noted that instead of the coordinate order of input voltage-current signal inputs to the phase detectors as shown in FIG. 1, the order of the connection of circuitry of FIG. 5 differs. Thus, in FIG. 5, the voltage-current input to the phase detectors is directly relatable in terms of the input phase designations A, B, and C. Accordingly, the voltage input to phase detector 122 is obtained from the A-B phase input, and the current of that phase detector is obtained from sampling the current through the A phase input. Similarly, the B-C phase input voltage applied to phase detector 124 is compared with the current input obtained from current flow through the B phase input. Finally, the C-A voltage input applied to phase detector 126 is compared with a current derived signal input from current flow through the phase C input. Further, the voltage input to each of the phase detectors and ramp generators of FIG. 5 is shifted by an R-C (resistance-capacitance) circuit consisting of resistor 131, resistor 133, and capacitor 135, which effects an essentially 40° lag in current with respect to voltage. It is found that a 40° phase lag produces the optimum delay of the trigger pulses required for turning on the Triacs.

Both of the embodiments of this invention illustrated herein provide a smooth current input control to motor 10 and accomplish a power factor type regulation of input power as a function of loading and without significant motor instability.

I claim:
1. A power factor control system for a three phase A.C. induction motor comprising:
first, second and third phase detection means for sampling the current and voltage in each of said three phases and providing discrete outputs wherein each is proportional to the in-phase state of one discrete phase;
summing means for combining the three current-voltage state outputs of said detection means and providing a current-voltage state signal at three times the rate of a sample from one of said phases;
means for providing a power factor command signal;
difference means for subtracting said command signal from said current-voltage state signal to provide a difference signal;
signal conditioning means responsive to said difference signal for providing a control signal which is essentially smooth with respect to the average value of said current-voltage state signal, but includes changes occurring at a change in motor loading; and control means, including switching means connected in series with each phase input of said motor, said switching means being responsive to said control signal for varying the "on" time of each cycle of input power to a said phase input as a direct function of load on a said motor.

2. A power factor control system as set forth in claim 1 wherein:
each said switching means comprises an SCR, and there is an oppositely polarized rectifier connected across each said SCR;
each said detection means samples one-half cycle of electrical current and voltage; and
said signal conditioning means includes signal means for effecting, with an increase in frequency, a lag function, then a diminished lag function, and finally an increased lag function, whereby the stability of motor operation is enhanced.

3. A power factor control system as set forth in claim 2 wherein:
said control means includes a half wave signal ramp generator and a comparator for each said phase;
each said comparator includes means responsive to said control signal and a signal from one said ramp generator for providing a gating signal of a width which varies inversely as a function of the amplitude of said control signal; and
a high frequency signal and gating means responsive to said gating signal from said comparator for applying said high frequency signal as a "turn on" signal to a said SCR.

4. A power factor control system as set forth in claim 1 wherein:
each said switching means comprises a Triac;
each said phase detection means samples both half cycles of an alternating current input to a said phase; and
said signal conditioning means includes signal feedback means for effecting, with an increase in frequency, a series of functions to achieve stability of motor operation.

5. A power factor control system as set forth in claim 4 wherein:
said control means includes a full wave signal ramp generator and comparator for each said phase;
each said comparator includes means responsive to said control signal and a signal from a ramp generator for providing a gating signal of a width which varies as an inverse function of said control signal; and
a high frequency signal and gating means responsive to said gating signal from said ramp generator for applying said high frequency signal as a "turn on" signal to each said Triac.

6. A power factor control system as set forth in claim 1 wherein:
said signal conditioning means includes a delay circuit means to initially override said difference signal for a short period so as to bring said motor up to operating speed before initiating a control signal.

7. In a power factor control system for a three-phase alternating current induction motor adapted to be loaded, which system comprises an electronic switching means individually connected between the respective phase terminals of a three-phase supply line and the corresponding phase windings of the motor, a phase detector means for detecting the motor voltage and current in at least one phase winding and for producing a signal output proportional to the phase difference between the phase voltage and current, power factor command signal generating means for providing a power factor command signal, and a control means responsive to the output of said phase detector means and to said power factor command signal for controlling switching of said electronic switching means, the improvement to enhance motor operation stability, comprising:
first, second, and third phase detection means for sampling the motor voltage and current at not more than each full cycle of input alternating power input to each of said three motor phases and providing discrete pulse signal outputs, each discrete pulse signal output indicating the phase difference between the voltage and current in one discrete phase;
summing means for combining said pulse signal outputs into a series, each series having three times the number of pulse signal outputs as from a single detection means;
operational means for receiving the summed series of said discrete pulse signal outputs from said summing means and said power factor command signal for providing a control signal which is essentially smooth and has a direct current character but includes those amplitude changes occurring at a change in loading of said motor;
and first, second, and third control means responsive to said control signal of said operational means and each responsive to the voltage phase input of an individual winding of said motor for producing a distinct triggering signal to said electronic switching means for that individual winding of the motor for varying the "on" time of cycle of input power to said motor as a direct function of load on said motor.

8. The improvement in a power factor control system as set forth in claim 7 wherein:
each said phase detection means provides a single output at each half cycle of an alternating current input to a discrete phase of said motor.

9. The improvement in power factor control system as set forth in claim 7 wherein:
said operation means includes feedback means for effecting with an increase in frequency a series of functions for achieving stability of motor operation.

10. The improvement in a power factor control system as set forth in claim 8 wherein:
each said control means includes a ramp generator and a comparator;
each said comparator includes means responsive to said control signal and a signal from one of said ramp generators for providing a gating signal of a width which varies inversely as a function of the amplitude of said control signal, and a high frequency signal and gating means responsive to said gating signal from said comparator for applying said high frequency signal as a "turn-on" signal to said switching means.

11. The improvement in a power factor control system as set forth in claim 10 wherein:
said signal ramp generator is a half wave signal ramp generator.

12. The improvement in a power factor control system as set forth in claim 10 wherein:

said signal ramp generator is a full wave signal ramp generator.

13. The improvement in a power factor control system as set forth in claim 7 wherein:
said control signal represents a difference between said power factor command signal and said series of said discrete signal outputs of said summing means.

14. The improvement in a power factor control system as set forth in claim 13 wherein:
said operation means includes an operational amplifier.

15. The improvement in a power factor control system as set forth in claim 7 wherein:
each said discrete signal output of said phase detection means has a signal width proportional to the phase difference between voltage and current of one discrete phase.

16. A power factor control system having a three phase alternating current induction motor adapted to be loaded comprising:
first, second, and third phase detection means for detecting the current and voltage in each of said three motor phases at not more than each full cycle of alternating power input thereto, and for providing discrete pulse signal outputs, each said discrete pulse signal output having a time width proportional to the phase difference between the voltage and current in that phase;
summing means for combining said discrete pulse signal outputs into a series having three times the number of pulse signal outputs as from a single detection means;
means for generating a power factor command signal of a direct current character;
operation means for receiving the summed series of discrete pulse signal outputs from said summing means and the power factor command signal to produce a control amplitude output signal which is essentially smooth but includes those amplitude changes occurring at a change in loading of said motor;
said operation means including feedback means from its output to its input for achieving stability of motor operations;
first, second, and third ramp generator signal means for generating output signal ramps in response to phase voltage of each of said three motor phases;
first, second, and third comparators for receiving, respectively, the output signal ramps of said first, second, and third ramp generator means, and for receiving said control signal of said operation means and therefrom producing, respectively, a signal triggering pulse;
first, second, and third switching means, each including an electronic switch for connection in series with a phase input of a said motor, for receiving said signal triggering pulses from said first, second, and third comparators, respectively, for varying the "on" time of the electronic switch during each cycle of input power to a said phase input as a direct function of load on said motor.

17. A power factor control system as set forth in claim 16 wherein:
delay circuit means are provided to initially override the signal inputs to said operation means for a short period so as to bring said motor up to operating speed before initiating control of its input voltage.

18. A power factor control system as set forth in claim 16 wherein:
each said electronic switch is a Triac.

19. A power factor control system as set forth in claim 16 wherein:
each said electronic switch is an SCR with an opposite polarized rectifier connected across said SCR.

20. A power factor control system as set forth in claim 16 wherein:
said power factor command signal has an electrical state opposite to the electrical state of said summed series of pulse signal outputs from said detection means.

21. A power factor control system as set forth in claim 16 wherein:
said operation means includes an operational amplifier.

* * * * *